April 8, 1930.  E. TELTZ  1,753,221
AUTOMOBILE SIGNAL
Original Filed Oct. 3, 1927  2 Sheets-Sheet 1
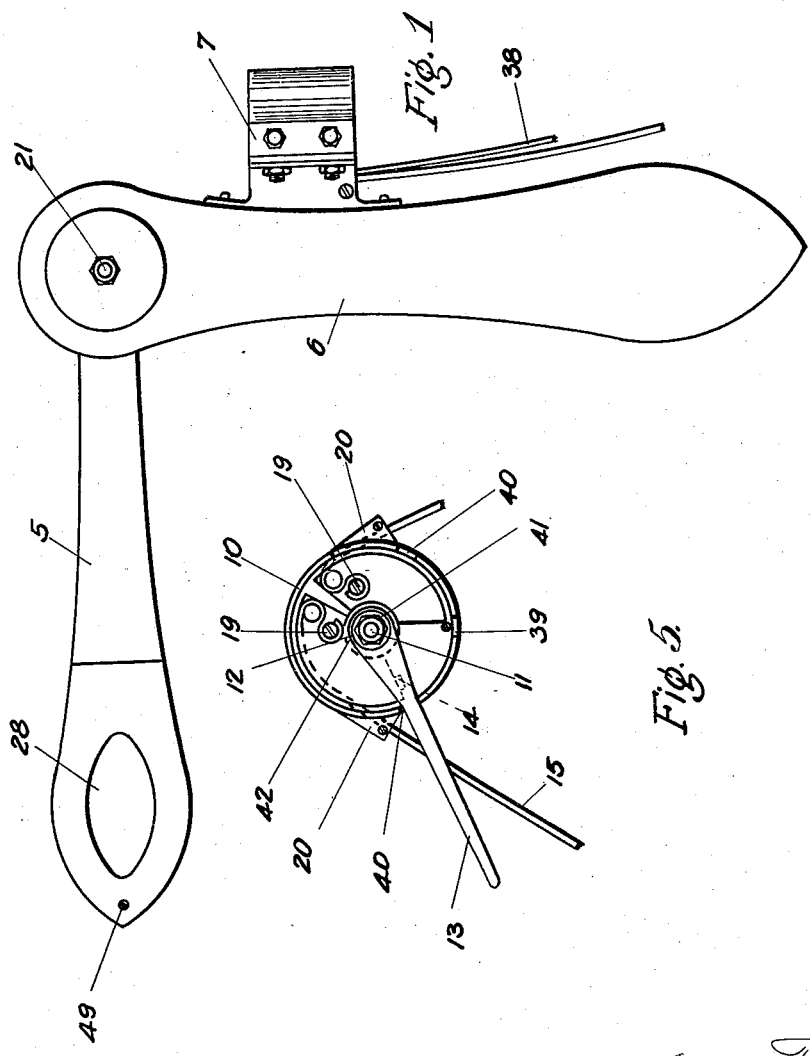
Ernst Teltz
INVENTOR.
BY Erich H. Michaelis
ATTORNEYS.

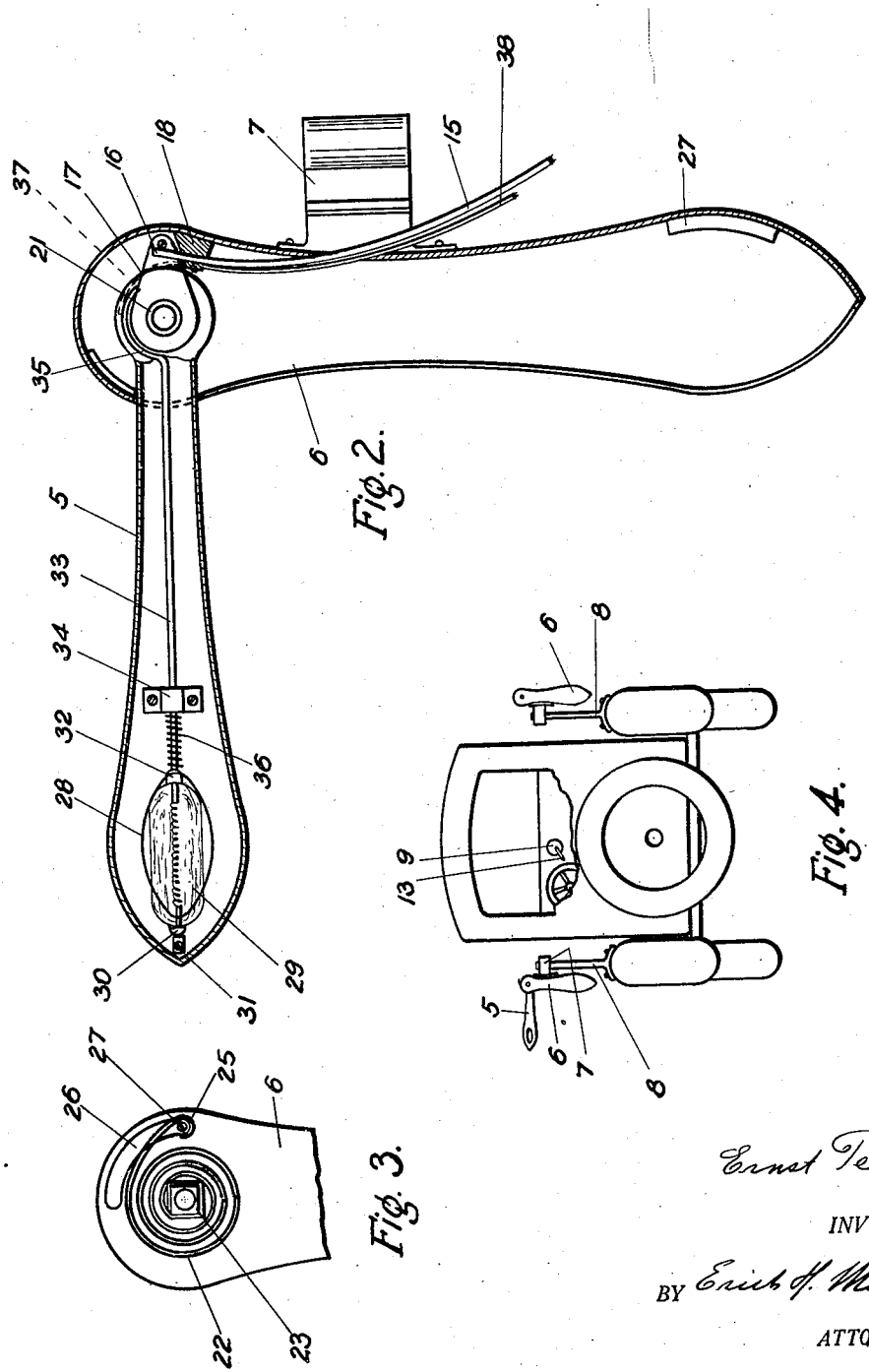

Patented Apr. 8, 1930

1,753,221

UNITED STATES PATENT OFFICE

ERNST TELTZ, OF CHICAGO, ILLINOIS

AUTOMOBILE SIGNAL

Application filed October 3, 1927, Serial No. 223,650. Renewed February 10, 1930.

The invention relates to automobile signals of that type used to indicate the direction in which the driver of the automobile intends to drive and the object of the invention is to provide a signaling device adapted to be easily and readily attached to an automobile in such a manner that it can be seen from the front of the automobile as well as from the rear, so that when the driver actuates said signal, the driver of another car following the car equipped with the signal according to the present invention can see said signal and that a driver of a car going in the opposite direction may also see said signal, as well, as for instance, a traffic officer, on a street crossing, or a pedestrian.

The signal is in the shape of a semaphore and while it has to be acknowledged that semaphore signals on automobiles and other vehicles as such are not new, the invention is claimed to reside in the construction of the different parts of the semaphore, the actuating mechanism connected therewith, and in the combination of said different parts.

In the drawings accompanying this specification, a preferred embodiment of the invention is illustrated. It is however to be understood that the invention is not to be limited or restricted to the exact formation and construction shown in said drawings and described in the annexed specification, but that such changes and alterations may be made as fall into the scope of the claim appended hereto.

In the drawings Figure 1 is an illustration of the invention with the semaphore arm in signaling position, and the actuating mechanism shown after the cover of the housing for said mechanism has been removed.

Figure 2 is an illustration of the apparatus showing the semaphore arm in signaling position and the housing for the semaphore arm as well as the arm itself opened, to show the inner construction thereof, Figure 3 is a detail of the upper part of the housing for the signaling arm and Figure 4 is a rear view of a vehicle equipped with the signaling device according to the present invention.

Fig. 5 is a detail view of the actuating mechanism.

A semaphore arm 5 is pivotally arranged in a housing 6 which is adapted to be fastened to a vehicle in such a manner that the semaphore arm will extend laterally of the vehicle, if said arm is in signaling position. The housing may for instance be equipped with a clamp 7 by means of which the device, in case it is to be used in connection with an automobile, may then be clamped to some bracket 8 or the like, which may be fastened to the rear fenders of said automobile, or any other suitable part thereof. Preferably two housings each containing a semaphore arm are utilized, so that it will be possible to indicate if the driver intends to turn to the right or to the left.

In order to actuate said semaphore arms an actuating mechanism is arranged in the neighborhood of the driver's seat, for instance, as indicated at 9, in Figure 4, next to the steering wheel. The actuating mechanism is enclosed in a housing 10 which is adapted to be closed by a cover which has been omitted in the drawings in order to simplify the illustration of the mechanism contained in said housing. In the housing 10, a stud 11 or the like is arranged centrally of said housing and two arcuate segments are provided with eyes 12 pivotally fitting around said stud. The eyes of said segments are located in different planes, so that they will be positioned one over the other one. An actuating lever 13 is also pivotally arranged on said stud and is provided with a downwardly extending lug 14 arranged between the two segments. It is easily to be seen, that, when the actuating lever 13 is moved in one direction, one of said segments will be engaged by the lug 14 and will be moved in the same directions in which the actuating lever is being moved.

A cable 15 which may be incased in a flexible housing (not shown) is connected with one of its ends to the upper end of the signaling arm 5 as indicated at 16 in Figure 2. For this purpose a short arm 17 may be attached to the upper part of the signaling arm 5 and to the upper portion of said lever arm may then be fastened to the cable 15. In the casing 6 of the signaling arm, a lug 18 may be provided and so positioned, that the lever arm 17 will abut said lug when the signaling arm 5 is in signaling position thereby limiting the swinging movement of the signaling arm when the same is being positioned in the signaling.

The other end of said cable is attached to one of the segments, for instance by means of the clamping screw 19. In order to guide the cables into the housing 10, said housing is provided with sleeves 20 which are equipped with bores accommodating each one cable 15. When the two semaphore arms are thus connected with the segments, it is only necessary for the driver to move the lever 13 in that direction in which he wants to turn, whereby he will move the corresponding segment, so that the cable connected therewith will be pulled inwardly of the housing 10, whereby then the semaphore arm connected with said cable will be swung into signaling position. As soon as the actuating lever 13 is into neutral position the segment will be free to return also into neutral position, and this will be accomplished partly by the weight of the signaling arm, which will tend to swing said arm about its supporting bolt 21 into vertical position, and partly by means of a spiral spring 22 which, as indicated in Figure 3, is fastened with its central end on a square boss 23 provided on the housing 6 of the semaphore arm. A pin 24 is set onto the lever arm 17 adjacent the outermost end thereof and the spiral spring 22 has a hook shaped outer end 25 which is adapted to engage the pin 24 which extends through an arcuate slot 26 provided in the housing 6. The center for the curve of the slot is the axis of rotation of the semaphore arm 5. It is hardly necessary to say that the housing 6 is open on one side practically over the whole length thereof, in order to enable the arm 5 to swing in and out of the housing. In order to brake the force with which the arm returns into the housing under its own weight and the pressure of the spring 22 a pad 27 of felt or the like may be provided in the housing.

To increase the visibility of the semaphore arm and especially to make it possible to use the apparatus also in night-time, diaphanous portions 28 are inserted in the semaphore arm adjacent the outer end thereof. If it is desired the whole semaphore arm could be made from some suitable diaphanous material, but it is preferred to make the main part of said semaphore arm of metal in order to make it possible to close an electric circuit by grounding one of the conductors. Said electric circuit is used to energize an electric lamp 29. In Figure 2 an electric lamp is shown which has two terminal ends the terminal end 30 being set into a socket 31 provided in the metal part of the semaphore arm 5 so that this end would be actually grounded. The other terminal end of the lamp 29 is set into a second socket 32 which is attached to a metal rod 33 slidably carried by a bracket 34 in the semaphore arm 5. The rod 33 is isolated from the semaphore arm 5 and ends into an arcuate contact portion 35. A spring 36 abutting with one of its ends with bracket 24 and with the other end socket 32 forces said socket against the terminal end of the lamp 29 thereby holding said lamp safely to position.

A spring contact 37 is provided inside the housing 6 and isolated therefrom, and an electric conductor 38 leads from this contact spring to a source of electric current which is commonly employed on motor vehicles, such as for instance, a battery or magneto or the like. The arcuate contact part 35 and the spring contact 37 are arranged in such a manner, that, when the arm 5 would be swung into signaling position, the contact will be closed, whereby then the lamp 29 will be energized, so that the signal may be seen over a considerable distance.

In order to have access to the electric lamp 29 for the purpose of replacing the same or any other purpose one part of the housing 6 is removable from the main part of the housing, and may be held in position for instance by means of a screw 44 or the like.

In order to prevent the actuating lever 13 to be moved accidently in either direction and thereby giving a wrong signal, the side wall of the housing 10 is provided with three notches. One center notch 39 and two side notches 40. When the actuating lever is in its neutral position it would be located over the notch 39. In order to force the lever into the notch, a spring 41 is provided between the eye part of said lever and the nut 42 screwed onto the stud 11 over the lever 13, so that the lever 13 will be held in the notch 39 under the pressure of the spring 42, until it will be necessary to actuate one of the signal arms 5. It will then only be necessary to lift the lever 13 against the pressure of the spring 42 out of the notch 39 and move it into position over the notch 40. The spring 42 will then force said lever into said corresponding notch thereby preventing an accidental movement of the lever 13 and thereby also preventing an accidental movement of the semaphone arm 5.

What I claim as new and desire to secure by Letters Patent is:

In a device of the class described in combination with a vehicle a semaphore arm, a housing for said arm adapted to be fastened to the vehicle, the arm being pivotally mounted in its housing, an actuating lever, a housing therefor mounted adjacent the driver's seat of the vehicle, the lever being pivotally supported in said housing, a segment also pivotally mounted in said housing and adapted to be engaged and to be pivoted by said actuating lever, a cable, one end of said cable being fastened to the segment and the other end to the semaphore arm, means on the actuating lever for engaging the segment and for moving it in one direction, means in the semaphore housing for urging the semaphore arm and the segment connected therewith into neutral position and means on the housing for the actuating lever for preventing accidental movement of said lever.

In witness whereof I affix my signature.

ERNST TELTZ.